(12) United States Patent
Amano

(10) Patent No.: US 7,067,078 B2
(45) Date of Patent: Jun. 27, 2006

(54) INJECTION MOLDING MACHINE HAVING AN ACCUMULATOR AND A CONTROL METHOD FOR THE INJECTION MOLDING MACHINE

(75) Inventor: Mitsuaki Amano, Chiba (JP)

(73) Assignee: Sumito Heavy Industries, Ltd., Tokyo (JP)

( * ) Notice: Subject to any disclaimer, the term of this patent is extended or adjusted under 35 U.S.C. 154(b) by 304 days.

(21) Appl. No.: 10/292,446

(22) Filed: Nov. 13, 2002

(65) Prior Publication Data

US 2003/0090019 A1 May 15, 2003

(30) Foreign Application Priority Data

Nov. 14, 2001 (JP) .............................. 2001-348601

(51) Int. Cl.
*B29C 45/82* (2006.01)
(52) U.S. Cl. .................... 264/40.1; 264/328.1; 425/149
(58) Field of Classification Search ............... 264/40.1, 264/40.5, 328.1; 425/145, 149, 587
See application file for complete search history.

(56) References Cited

U.S. PATENT DOCUMENTS

| | | | |
|---|---|---|---|
| 4,208,879 A | 6/1980 | Segawa | |
| 5,688,535 A | 11/1997 | Koda et al. ................. | 425/145 |
| 5,747,076 A | 5/1998 | Jaroschek et al. .......... | 425/145 |
| 6,120,711 A | 9/2000 | Takizawa ................... | 264/40.1 |
| 6,183,682 B1 | 2/2001 | Shimizu et al. .......... | 264/328.1 |
| 6,289,259 B1 | 9/2001 | Choi et al. | |
| 2002/0053204 A1 | 5/2002 | Kogane et al. | |

FOREIGN PATENT DOCUMENTS

| | | |
|---|---|---|
| CN | 1259427 A | 7/2000 |
| DE | 198 01 881 | 5/1999 |
| DE | 101 04 109 | 9/2002 |
| EP | 0 995 578 A2 | 4/2000 |
| GB | 688668 | 3/1953 |
| JP | 7-290549 | 11/1995 |
| JP | 10-272666 | 10/1998 |
| JP | 99121930.9 | 7/1999 |
| JP | 11-240056 | 9/1999 |

OTHER PUBLICATIONS

Jpanese Patent 07-290549—electronic translation.*
Patent Abstracts of Japan, vol. 017, No. 352, Jul. 5, 1998 and JP 05 050483 A, Mar. 2, 1993.
Patent Abstracts of Japan, vol. 1999, No. 02, Feb. 26, 1999 and JP 10 296815 A, Nov. 10, 1998.
Patent Abstracts of Japan, vol. 014, No. 532, Nov. 22, 1990 and JP 02 225020 A, Sep. 7, 1990.

* cited by examiner

*Primary Examiner*—Jill L. Heitbrink
(74) *Attorney, Agent, or Firm*—Squire, Sanders & Dempsey LLP

(57) ABSTRACT

An injection molding machine includes an actuator supplied oil so as to actuate, an accumulator in which the oil, supplied to the actuator and having an accumulating hydraulic pressure set in a range of designated values, is accumulated, an accumulating hydraulic pressure determining part configured to determine whether or not the accumulating hydraulic pressure is sufficiently higher than an actuating hydraulic pressure that is a hydraulic pressure for actuating the actuator, and an accumulating hydraulic pressure change part configured to reduce a set value of the accumulating hydraulic pressure in a case where the accumulating hydraulic pressure is sufficiently higher than the actuating hydraulic pressure.

10 Claims, 3 Drawing Sheets

INJECTION PROCESS
AND
HOLDING PRESSURE PROCESS

INJECTION PROCESS
AND
HOLDING PRESSURE PROCESS

INJECTION MOLDING MACHINE HAVING AN ACCUMULATOR AND A CONTROL METHOD FOR THE INJECTION MOLDING MACHINE

BACKGROUND OF THE INVENTION

1. Field of the Invention

The present invention generally relates to injection molding machines having accumulators and control methods for the injection molding machine. More particularly, the present invention relates to an injection molding machine having an accumulator supplying oil to an actuator so that the actuator is actuated and a control method for the injection molding machine.

2. Description of the Related Art

A related art injection molding machine includes an injection apparatus and a mold clamping apparatus. In the related art injection molding machine, a screw is disposed inside a heating cylinder so that the screw can be rotated about an axis and can be advanced and retracted. In a metering process, the screw is rotated so that a resin supplied from the hopper to the heating cylinder is heated, melted and advanced. Because of this, a front part of the screw head formed at a front end of the screw is filled with the resin.

In an injection process, the screw is advanced so that the resin in the front part of the screw head is injected from an injection nozzle. As a result of this, a cavity space of the mold clamping apparatus is filled with the resin. A pressure of the resin in the cavity space of the mold clamping apparatus is held in a holding pressure process. After that, in a cooling process, the resin is cooled so that a molded article is obtained.

In such the related art injection molding machine, a screw motor that is a hydraulic motor is provided for rotating the screw. In addition, an injection cylinder is provided for advancing the screw.

Furthermore, a hydraulic circuit is formed at the injection molding machine. That is, in the hydraulic circuit, oil transmitted from a hydraulic pump is supplied to the hydraulic motor and the injection molding cylinder by an accumulator, so that the hydraulic motor and the injection molding cylinder are driven. That is, the accumulator functions so as to supply a sufficient amount of the oil to the hydraulic motor and the injection molding cylinder and hold a designated pressure in the hydraulic circuit.

Accordingly, the oil having a designated pressure (hereinafter an "accumulator pressure") is accumulated in the accumulator. In addition, in the injection process and the holding pressure process, the oil that is accumulated in the accumulator and has the designated pressure is supplied to the injection cylinder by a valve for adjusting the flow amount and the pressure, so that the velocity of the screw and the force for holding pressure are controlled.

However, in the related art injection molding machine having the above mentioned hydraulic control system, in a case where the accumulator pressure is much higher than the pressure generated by the oil that is supplied to the injection cylinder during the injection process, oil causing the unnecessarily high accumulator pressure is accumulated in the accumulator. This causes a useless consumption of energy so that it is difficult to produce the molded article with good energy efficiency.

SUMMARY OF THE INVENTION

Accordingly, it is a general object of the present invention to provide a novel and useful injection molding machine having an accumulator so that it is possible to produce the molded article without consuming useless energy and a control method of the injection molding machine, in which one or more of the problems described above are eliminated.

Another and more specific object of the present invention is to provide an injection molding machine, including an actuator supplied oil so as to actuate, an accumulator in which the oil, supplied to the actuator and having an accumulating hydraulic pressure set in a range of designated values, is accumulated, an accumulating hydraulic pressure determining part configured to determine whether or not the accumulating hydraulic pressure is sufficiently higher than an actuating hydraulic pressure that is a hydraulic pressure for actuating the actuator, and an accumulating hydraulic pressure change part configured to reduce a set value of the accumulating hydraulic pressure in a case where the accumulating hydraulic pressure is sufficiently higher than the actuating hydraulic pressure.

It is also object to provide a control method of an injection molding machine, comprising the steps of: a) setting a range of an accumulating hydraulic pressure that is a hydraulic pressure of oil accumulated in an accumulator and is supplied to an actuator in order to actuate the actuator, b) detecting an actuating hydraulic pressure that is a hydraulic pressure of oil actuating the actuator, c) determining whether or not the accumulating hydraulic pressure is sufficiently higher than the actuating hydraulic pressure, and d) reducing the set accumulating hydraulic pressure in a case where the accumulating hydraulic pressure is sufficiently higher than the actuating hydraulic pressure.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIGS. 1 through 4, of embodiments of the present invention. Electric injection molding machines will be described as examples of the embodiments of the present invention.

Figure 1:
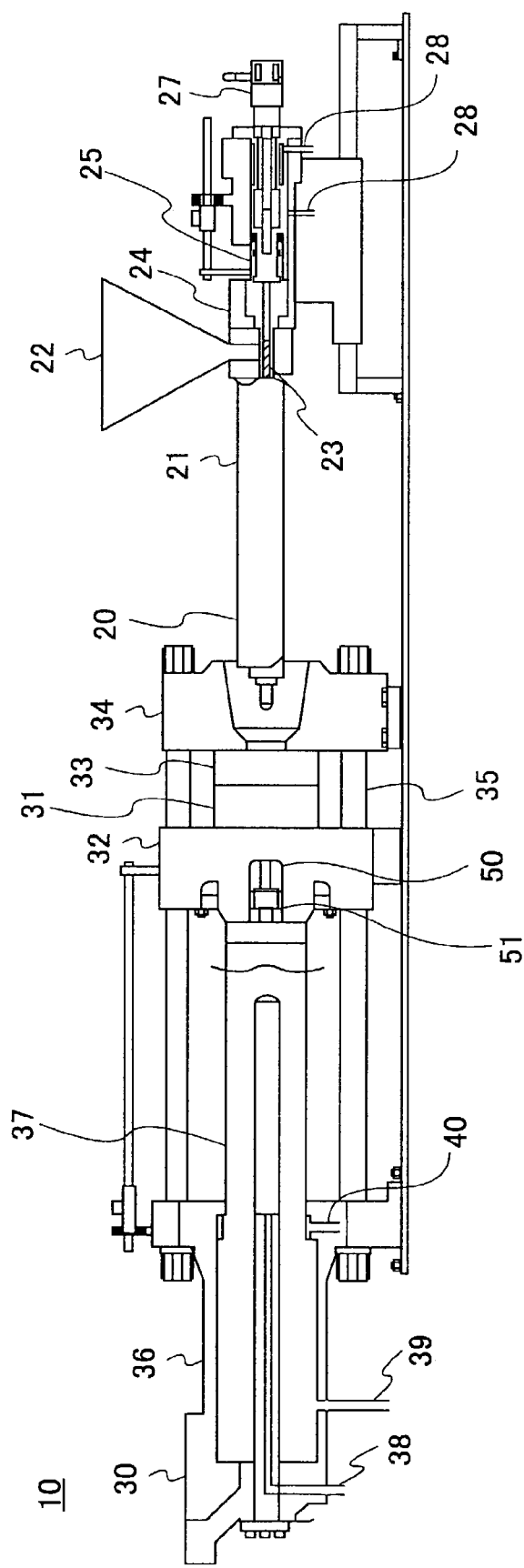
FIG. 1 is a schematic view showing an injection molding machine 10 of the present invention.

FIG. 1 is a schematic view showing an injection molding machine 10 of the present invention.

Referring to FIG. 1, an injection molding machine 10 includes an injection apparatus 20 and a mold clamping apparatus 30.

A heating cylinder 21 is provided for the injection apparatus 20. A hopper 22 is disposed at the heating cylinder 21.

A screw 23 is disposed inside the heating cylinder 21 so that the screw 23 can be rotated about an axis and can be advanced and retracted. An injection cylinder 24 is provided at an end side of the screw 23.

An injection piston 25 is disposed inside of the injection cylinder 24 so as to move in a straight line direction. The injection piston 25 is reciprocating-operated based on a supply of pressurized oil from an oil path 28 so that the screw 23 is advanced and retracted. At a rear side of the injection piston 25, a screw motor 27 that is a hydraulic motor for rotating the screw 23 is provided in the same axial direction with the screw 23, the injection cylinder 24, and the injection piston 25.

The mold clamping apparatus 30 includes a movable platen 32 having a movable mold 31 and a stationary platen 34 having a stationary mold 33. The movable platen 32 is connected to the stationary platen 34 by tie bars 35. The movable platen 32 can slide along the tie bars 35.

A clamping cylinder 36 is provided at a rear side (the left side in FIG. 1) of the movable platen 32. A clamping piston 37 is provided inside of the clamping cylinder 36 so that the clamping piston 37 can be advanced and retracted. The clamping piston 37 is reciprocating-operated based on a supply of pressurized oil from oil paths 38, 39 and 40 so that the movable platen 32 can be advanced and retracted.

The mold clamping apparatus 30 further includes an ejector apparatus 50 having an ejector cylinder 51. An ejector pin is disposed inside of the ejector cylinder 51 so that the ejector pin can be advanced and retracted. The ejector pin is reciprocating-operated based on a supply of pressurized oil so that the molded article is taken off from the movable mold 31.

Figure 2:
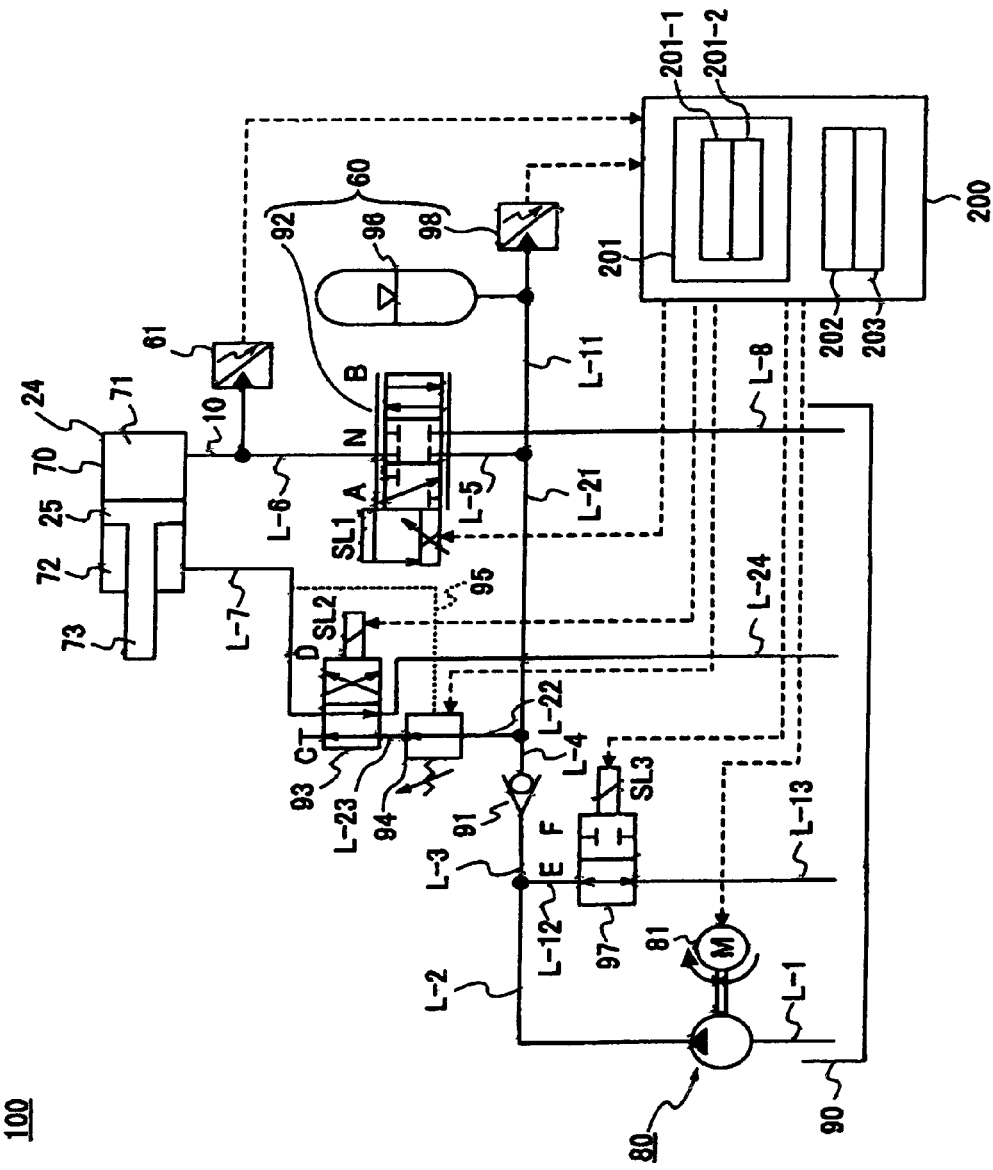
FIG. 2 is a schematic view of an hydraulic control system that is used for the injection molding machine 10 illustrated in FIG. 1 and an injection cylinder 24 illustrated in FIG. 1 is used as an actuator therein.

FIG. 2 is a schematic view of an hydraulic control system that is used for the injection molding machine 10 illustrated in FIG. 1 and an injection cylinder 24 illustrated in FIG. 1 is used as an actuator therein.

Referring to FIG. 2, a hydraulic control system 100 of the injection molding machine 10 of this embodiment includes the injection cylinder 24 as a first actuator, the screw motor 27 that is a hydraulic motor as a second actuator (illustrated in FIG. 1), a hydraulic circuit 60, a pressure sensor 61, a oil pump 80, a oil tank 90, a check valve 91 for ensuring the oil flows in one direction only, a valve 92 for adjusting the flow amount and the pressure, a pull-back valve 93, a pull-back adjusting valve 94, an accumulator 96, a pressure sensor 98, a control part 200, and others.

The injection cylinder 24 is operated by supplying the oil from the oil path 28 illustrated in FIG. 1. The injection cylinder 24 has the injection piston 25 disposed inside of a cylinder body part 70 so that the injection piston 25 can be advanced and retracted in right and left directions in FIG. 2. The cylinder body part 70 is divided into a first oil room 71 and a second oil room 72 by the injection piston 25. The injection piston 25 is connected to the screw 23 illustrated in FIG. 1 by a piston rod 73.

As described above, the screw 23 is disposed inside the heating cylinder 21 of the injection molding machine 10 so that the screw 23 can be rotated about an axis and can be advanced and retracted (See FIG. 1.). The oil is supplied to the screw motor 27 illustrated in FIG. 1 so that the screw motor 27 is driven and the screw 23 is rotated. In addition, the oil is supplied to the injection cylinder 24 so that the injection cylinder 24 is driven and the screw 23 is advanced and retracted.

The oil pump 80 functions as a hydraulic supply source of the hydraulic control system 100. A motor (M) 81 is connected to the oil pump 80. The oil pump 80 is driven by rotating the motor 81 in an arrow direction.

The valve 92 for adjusting the flow amount and the pressure functions as an adjusting part for adjusting the amount and the pressure of oil supplied to the injection cylinder 24. It is not necessary for the valve 92 for adjusting the flow amount and the pressure to adjust both the amount and pressure of the oil. Rather, either the flow amount or the pressure of the oil supplied to the injection cylinder 24 may be adjusted. A hole for feed back is formed at the main spool of the valve 92 for adjusting the flow amount and the pressure.

The pull-back adjusting valve 94 receives the pressure of the oil path L-7 as a pilot pressure through a pilot oil path 95. An injection cylinder pressure that is an actuating hydraulic pressure of the injection cylinder 24 is generated by the oil supplied to the injection cylinder 24 that is an actuator.

The oil tank 90 is connected to the oil pump 80 by an oil path L-1. The oil pump 80 is connected to the check valve 91 by oil paths L-2 and L-3. The check valve 91 is connected to the valve 92 for adjusting a flow amount and the pressure by oil paths L-4, L-21 and L-5. The check valve 91 is connected to the pull-back adjusting valve 94 by the oil path L-4 and an oil path L-22.

The valve 92 for adjusting the flow amount and the pressure is connected to the first oil room 71 by an oil path L-6. The valve 92 for adjusting the flow amount and the pressure is connected to the oil tank 90 by the oil path L-8. The pull-back adjusting valve 94 is connected to the pull-back valve 93 by the oil path L-23. The pull-back valve 93 is connected to the second oil room 72 by the oil path L-7. The suck valve 93 is connected to the oil tank 90 by the oil path L-24.

In order to detect the injection cylinder pressure that is the actuating pressure of the injection cylinder 24, a pressure sensor 61 that is an actuating hydraulic pressure detecting part is provided at the oil path L-6. The injection cylinder pressure detected by the pressure sensor 61 is transmitted to the control part 200.

A solenoid SL1 receives a solenoid signal from the control part 200 so that the valve 92 for adjusting the flow amount and the pressure is switched and positioned at a position A, B or N. In a case where the valve 92 for adjusting the flow amount and the pressure is positioned at the position A, the oil path L-6 is connected to the oil path L-8. In a case where the valve 92 for adjusting the flow amount and the pressure is positioned at the position B, the oil path L-5 is connected to the oil path L-6. In a case where the valve 92 for adjusting the flow amount and the pressure is positioned at the position N, the connection among the oil paths L-5, L-6, and L-8 is cut off.

A solenoid SL2 receives a solenoid signal from the control part 200 so that the pull-back valve 93 is switched and positioned at a position C or D. In a case where the pull-back valve 93 is positioned at the position C, the oil path L-7 is connected to the oil path L-24. In a case where the pull-back valve 93 is positioned at the position D, the oil path L-23 is connected to the oil path L-7.

Oil having an accumulating hydraulic pressure is accumulated in the accumulator 96. The accumulator 96 is connected to the injection cylinder 24 by the valve 92 for adjusting the flow amount and the pressure. The accumulator 96 is connected to the oil path L-4 by the oil paths L-11 and L-21. A sufficient amount of the oil having the accumulating hydraulic pressure is supplied to the screw motor 27 illustrated in FIG. 1 and the injection cylinder 24 and a designated hydraulic pressure is held in the hydraulic pressure circuit 60, by the accumulator 96.

In order to control the accumulating hydraulic pressure of the accumulator 96, the charge valve 97 that is an accumulator control part is connected to the oil path L-2 by the oil path L-12. The charge valve 97 is connected to the oil tank 90 by the oil path L-13.

A solenoid SL3 receives a solenoid signal from the control part 200 so that the charge valve 97 is switched and positioned at a position E or F. In a case where the charge valve 97 is positioned at the position F so as to be made "off", the oil path L-12 is connected to the oil path L-13. In a case where the charge valve 97 is positioned at the position F so as to be made "on", the oil path L-12 and the oil path L-13 are cut off. In a case where the charge valve is positioned at the position F, the oil supplied from the oil pump 80 to the oil path L-2 is discharged to the oil tank 90 by the charge valve 97 and the oil path L-13. In this case, a flow of the oil from the side of the oil path L-4 to the side of the oil path L-3 is obstructed by the check valve 91. Accordingly, the oil in the oil paths on the discharge side of the check valve 91 is not discharged to the oil tank 90 by the charge valve 97.

The pressure sensor 98, that is an accumulating hydraulic presser detecting part for detecting an accumulating hydraulic pressure, is provided at the oil path L-11. The accumulating hydraulic pressure detected by the pressure sensor 98 is transmitted to the control part 200.

A process for controlling the accumulating hydraulic pressure is implemented by an accumulating hydraulic pressure control part 201 of the control part 200. That is, the accumulating hydraulic pressure control part 201 drives the solenoid SL3 based on an accumulating hydraulic pressure actually detected by the pressure sensor 98 and the above mentioned set pressure, so that the accumulating hydraulic pressure is controlled.

Referring to FIG. 1, in the metering process, the oil is supplied to the screw motor 27 so that the screw 23 is rotated. Because of this, the resin supplied from the hopper 22 into the heating cylinder 21 is heated, melted and advanced. Because of this, a front part of the screw head formed at the front end of the screw 23 is filled with the resin, so that the screw 23 is retracted.

Next, a flow of the oil in respective processes will be described. Referring to FIG. 2, in the pull-back process, the control part 200 sends solenoid signal to the solenoids SL1 and SL2. As a result of this, when the valve 92 for adjusting the flow amount and the pressure is positioned at a position A and the pull-back valve is positioned at a position D, the oil pump 80 takes suction on the oil in the oil tank 90 and pumps the oil to the oil path L-2. The oil transmitted to the oil path L-2 is transmitted to the pull-back adjusting valve 94 through the oil path L-3, the check valve 91, the oil path L-4 and the oil path L-22

The hydraulic pressure of the oil transmitted to the pull-back adjusting valve 94 is adjusted by the pull-back adjusting valve 94 so as to be transmitted to the pull-back valve 93 through the oil path L-23. The oil transmitted to the pull-back valve 93 is transmitted to the second oil room 72 through the oil path L-7.

The oil in the first oil room 71 is drained to the oil path L-6 so as to be supplied to the valve 92 for adjusting the flow amount and the pressure and transmitted to the oil tank 90 through the oil path L-8. As a result of this, the screw 23 illustrated in FIG. 1 is not rotated but retracted so that the pull-back process is implemented.

In the injection process, the control part 200 sends solenoid signals to the solenoids SL1 and SL2. As a result of this, when the valve 92 for adjusting the flow amount and the pressure is positioned at a position B and the pull-back valve 93 is positioned at a position C, the oil pump 80 takes suction on the oil in the oil tank 90 and pumps the oil to the oil path L-2. The oil transmitted to the oil path L-2 is transmitted to the oil path L-3, the check valve 91, the oil path L-4 and the oil path L-21. The oil transmitted to the oil path L-21 joins the oil having a held and designated accumulating hydraulic pressure and transmitted from the accumulator 96 through the oil path L-11, so as to be transmitted to the valve 92 for adjusting the flow amount and the pressure through the oil path L-5. The oil transmitted to the valve 92 for adjusting the flow amount and the pressure is transmitted to the first oil room 24 through the oil path L-6.

The oil in the second oil room 72 is drained to the oil path L-7 so as to be supplied to the pull-back valve 93 and transmitted to the oil tank 90 through the oil path L-24. As a result of this, the screw 23 illustrated in FIG. 1 is not rotated but advanced.

In this case, a process for controlling the injection is implemented and the solenoid SL1 is driven so as to change the screw velocity with a set pattern, by an injection control process part 202 of the control part 200. Therefore, the screw 23 illustrated in FIG. 1 is advanced at a designated screw velocity by supplying an amount of the oil adjusted with the valve 92 to the first oil room 71. In this case, an injection force corresponding to the injection pressure is generated.

Referring back to FIG. 1, the resin, with which the front part of the screw head is filled, is injected from the injection nozzle so that the cavity space of the movable mold 31 and the stationary mold 33 is filled with the resin. After that, in the holding pressure process, the pressure of the resin in the cavity space is held. Because of this, a holding force is controlled by a holding force control process part 203 of the control part 200.

Referring to FIG. 2, the solenoid SL1 is driven based on an injection cylinder pressure detected by the pressure sensor 61. Therefore, the screw 23 illustrated in FIG. 1 compresses the resin in the cavity space with a pressure adjusted with the valve 92 by supplying the oil having the pressure adjusted with the valve 92 to the first oil room 71, so that the holding force is generated. After that, in the cooling process, the resin is cooled so that the molded article is produced.

Meanwhile, an apparatus for setting is connected to the control part 200 of the injection molding machine 10. It is possible to select a normal mode operation or an energy-saving mode operation by operating the apparatus for setting. The normal mode is a mode for operating the injection apparatus 20 normally. The energy-saving mode is a mode for reducing energy consumed when the injection apparatus 20 is operated.

Figure 3:
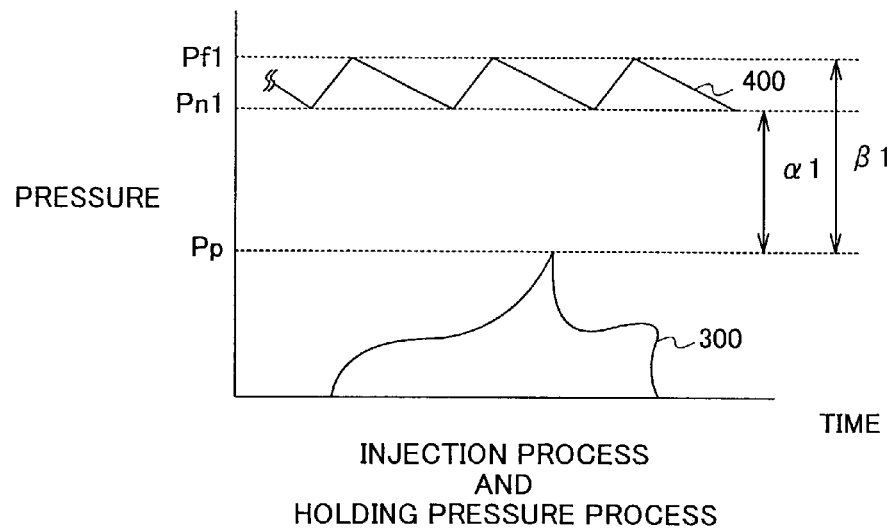
FIG. 3 is a time chart showing an operation of an injection molding machine in a case of a normal mode operation.
Figure 4:
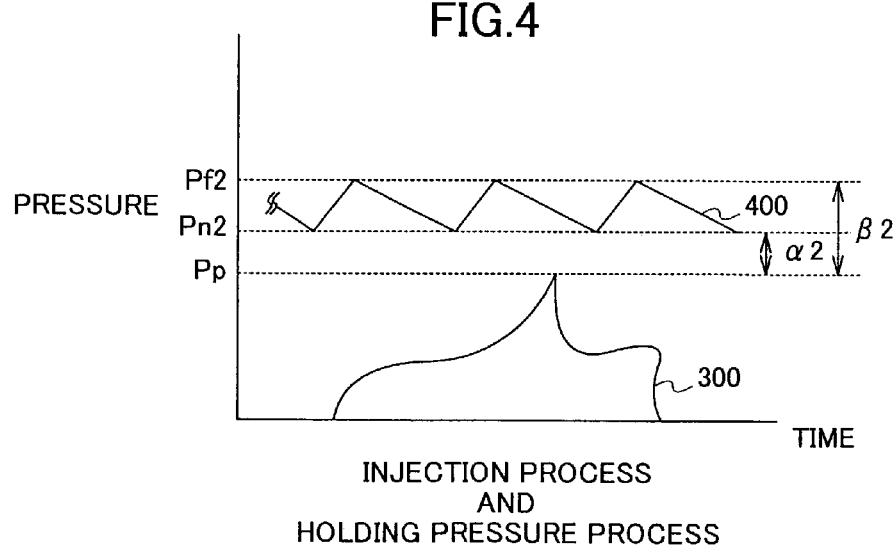
FIG. 4 is a time chart showing an operation of an injection molding machine in a case of an energy-saving mode operation.

Next, an operation of the injection molding machine 10 in the normal mode operation and the energy-saving mode operation will be described. FIG. 3 is a time chart showing an operation of an injection molding machine in a case of the normal mode operation. FIG. 4 is a time chart showing an operation of an injection molding machine in a case of the energy-saving mode operation.

Referring to FIG. 3, a first on-setting pressure Pn1 for making the charge valve 97 (illustrated in FIG. 2) controlling the accumulating hydraulic pressure 400 of the accumulator 96 "on" and a first off-setting pressure Pf1 for making the charge valve 97 "off" are set in the normal mode operation. The first off-setting pressure Pf1 is a higher setting value than the first on-setting pressure Pn1.

Referring to FIG. 4, a second on-setting pressure Pn2 for making the charge valve 97 (illustrated in FIG. 2) "on" and a second off-setting pressure Pf2 for making the charge valve 97 "off" are set in the energy-saving mode operation. The second off-setting pressure Pf2 is a higher setting value than the second on-setting pressure Pn2.

In addition, a peak pressure Pp that is a maximum pressure of the injection cylinder pressure 300 in the injection process is measured and pre-set by implementing a molding operation in the normal mode operation.

Referring to FIG. 3, the difference between the first on-setting pressure Pn1 and the peak pressure Pp is defined as "α1" and the difference between the first off-setting pressure Pf1 and the peak pressure Pp is defined as "β1". Referring to FIG. 4, the difference between the second on-setting pressure Pn2 and the peak pressure Pp is defined as "α2" and the difference between the second off-setting pressure Pf2 and the peak pressure Pp is defined as "β2". In this case, the following relationship is formed.

α1>α2, β1>β2

Referring to FIG. 3, in a case where the normal mode operation is set, the first on-setting pressure Pn1 and the first off setting pressure Pf1 are set as set pressures. The hydraulic pressure in the accumulator 98 illustrated in FIG. 2 is controlled based on the first on-setting pressure Pn1, the first off-setting pressure Pf1, and the accumulating hydraulic pressure 400 actually detected by the pressure sensor 98 in a case where the molding operation is implemented in the normal mode operation.

In the metering process and the injection process, in a case where the accumulating hydraulic pressure 400 (illustrated in FIG. 3) detected by the pressure sensor 98 is reduced so as to become the first on-setting pressure Pn1 based on the operation of the screw motor 27 and the injection cylinder 24, the accumulating hydraulic pressure control part 201 of the control part 200 transmits a solenoid signal to the solenoid SL3. The accumulating hydraulic pressure control part 201 furthermore drives the solenoid SL3 so that the charge valve 97 is made "on" so that the charge valve is positioned at the position F. Because of this, as described above, the oil transmitted by the oil pump 80 is supplied to the injection cylinder illustrated in FIG. 1 and then to the accumulator 96 through the oil paths L-4, L-21, and L-11. As a result of this, the accumulating hydraulic pressure 400 illustrated in FIG. 3 becomes high.

When the accumulating hydraulic pressure 400 (illustrated in FIG. 3) detected by the pressure sensor 98 becomes the first off-setting pressure Pf1, the accumulating hydraulic pressure control part 201 does not transmit the solenoid signal to the solenoid SL3, but rather stops driving the solenoid SL3. The accumulating hydraulic pressure control part 201 makes the charge valve 97 "off" so that the charge valve 97 is positioned at the position E. As a result of this, the oil transmitted by the oil pump 80 is discharged to the oil tank 90 through the oil path L-2, the oil-path L-12, the charge valve 97, and the oil path L-13. In this case, the flow of the oil from the side of the oil path L-4 to the side of the oil path L-3 is obstructed by the check valve 91. Hence, the oil in oil paths on the discharge side of the check valve 91 is prevented from being discharged to the oil tank 90. However, the accumulating hydraulic pressure 400 (illustrated in FIG. 3) is reduced gradually due to a natural reduction of the pressure in oil paths on the discharge side of the check valve 91.

Thus, based on a repetition of "on" and "off" of the charge valve 97, the accumulating hydraulic pressure 400 (illustrated in FIG. 3) is held between the first on-setting value Pn1 and the first off-setting value Pf1.

Next, based on the start of the injection process, the oil having an amount adjusted by the valve 92 is supplied to the first oil room 71. Based on the start of the holding pressure process, the oil having the injection cylinder pressure 300 (illustrated in FIG. 3) adjusted by the valve 92 is supplied to the first oil room 71. Even during a period of the time in the above mentioned process, an operation of "on" and "off" of the charge valve 97 is repeated. Therefore, the accumulating hydraulic pressure 400 (illustrated in FIG. 3) is held between the first on-setting pressure Pn1 and the first off-setting pressure Pf1.

Meanwhile, the accumulating hydraulic pressure control part 201 of the control part 200 includes an accumulating hydraulic pressure determining part 201-1 and an accumulating hydraulic pressure change part 201-2.

In a case where the energy-saving mode operation is set, the accumulating hydraulic pressure determining part 201-1 determines the accumulating hydraulic pressure. That is, the accumulating hydraulic pressure determining part 201-1 determines whether or not the accumulating hydraulic presser 400 (illustrated in FIG. 3) is sufficiently higher than the injection cylinder pressure 300 that is the actuating hydraulic pressure of the injection cylinder 24. More particularly, the accumulating hydraulic pressure determining part 201-1 calculates α1 that is the difference between the first on-setting pressure Pn1 and the peak pressure Pp and "β1−α1" that is a hysteresis difference between the first off-setting pressure Pf1 and the first on-setting pressure Pn1.

The accumulating hydraulic pressure determining part 201-1 compares the difference α1 and the hysteresis difference "β1−α1".

Based on the comparison of the difference α1 and the hysteresis difference "β1−α1", The accumulating hydraulic pressure determining part 201-1 determines whether or not the difference β1 is sufficiently bigger than the hysteresis difference "β1−α1" (namely, α1>>β1−α1) so as to be possible to mold in the energy-saving mode operation under the substantially same conditions as the normal mode operation. It is preferable that a difference between α1 and "β1−α1" is larger than approximately 0.3 MPa.

Based on a result of the determination, the accumulating hydraulic pressure determining part 201-1 determines whether or not the accumulating hydraulic pressure 400 is sufficiently higher than the injection cylinder pressure 300.

In a case where the accumulating hydraulic pressure 400 is sufficiently higher than the injection cylinder pressure 300, that is the difference α1 is sufficiently bigger than the hysteresis difference "β1−α1", the accumulating hydraulic pressure change part 201-2 of the control part 200 changes the accumulating pressure. That is, the second on-setting pressure Pn2 and the second off-setting pressure Pf2, as shown in FIG. 4, are set as set pressures.

The accumulating hydraulic pressure control part 201 controls the accumulating hydraulic pressure 400 based on the actual accumulating hydraulic pressure, the second on-setting pressure Pn2, and the second off-setting pressure off-setting pressure Pf2.

That is, the accumulating hydraulic pressure is reduced based on the operation of the screw motor 27 (illustrated in FIG. 1) and the injection cylinder 24 (illustrated in FIG. 1), so that the accumulating hydraulic pressure 400 illustrated in FIG. 4 detected by the pressure sensor 98 becomes the second on-setting pressure Pn2. In this case, the accumulating hydraulic pressure control part 201 transmits the solenoid signal to the solenoid SL3. The charge valve 97 is made "on" by driving the solenoid SL3 so as to be positioned at the position F. As a result of this, the oil transmitted by the oil pump 80 is supplied to the accumulator 96 through the oil path L-2, the oil path L-3, the check valve 91, the oil path L-4 and the oil path L-11, so that the accumulating hydraulic pressure 400 becomes high.

In a case where the accumulating hydraulic pressure 400 detected by the pressure sensor 98 becomes the second off-setting pressure Pf2, the accumulating hydraulic pressure control part 201 does not send the solenoid signal to the solenoid SL3 but stops driving the solenoid SL3. As a result of this, the charge valve 97 is made "off" so as to be positioned at the position E. Hence, the oil transmitted by the oil pump 80 is discharged to the oil tank 90 through the oil path L-2, the oil path L-12, the charge valve 97, and the oil path L-13.

Thus, based on a repetition of "on" and "off" of the charge valve 97, the accumulating hydraulic pressure 400 is held between the second on-setting value Pn2 and the second off-setting value Pf2.

Generally, when the accumulating hydraulic pressure is reduced, controllability of the injection process and the holding pressure process is reduced. Hence, in a case where the energy-saving mode is detected, control gains in the injection process and the holding pressure process are automatically switched so as to become large. Accordingly, abilities of response of the screw motor 27 (illustrated in FIG. 1) and the injection cylinder 24 (illustrated in FIG. 1) can be made high.

Thus, in a case where the energy-saving mode shown in FIG. 4 is selected, it is possible to reduce the difference between the accumulating hydraulic pressure 400 and the injection cylinder pressure 300. Accordingly, the accumulator 96 can be prevented from being filled with the oil having an unnecessarily high accumulating hydraulic pressure. Hence, it is possible to reduce the pressure of the oil generated by the oil pump 80 so that it is possible to reduce the load applied to the oil pump 80 that is the hydraulic pressure supply source. As a result of this, useless energy is prevented from being consumed.

The present invention is not limited to these embodiments, but variations and modifications may be made without departing from the scope of the present invention. For example, although the injection molding machine 10 having the hydraulic control system 100 to the injection cylinder 24 as an actuator is described in the above mentioned embodiment, the present invention can be applied to an injection molding machine having a hydraulic control system with the clamping cylinder 36 or the ejector cylinder 51 as an actuator.

This patent application is based on Japanese priority patent application No. 2001-348601 filed on Nov. 14, 2001, the entire contents of which are hereby incorporated by reference.

What is claimed is:

1. A control method of an injection molding machine, comprising the steps of:
    a) setting a range of an accumulating hydraulic pressure that is a hydraulic pressure of oil accumulated in an accumulator and is supplied to an actuator in order to actuate the actuator;
    b) supplying oil from a hydraulic supply source at a certain amount and a certain pressure;
    c) detecting an actuating hydraulic pressure that is a hydraulic pressure of oil actuating the actuator and the accumulating hydraulic pressure;
    d) determining whether or not the detected accumulating hydraulic pressure is sufficiently higher than the detected actuating hydraulic pressure; and
    e) reducing the accumulating hydraulic pressure range in a case where the detected accumulating hydraulic pressure is sufficiently higher than the detected actuating hydraulic pressure, wherein the accumulating hydraulic pressure is controlled in the range defined by an on-setting pressure for making the accumulator control part ON and an off-setting pressure for making the accumulator control part OFF.

2. The control method of an injection molding machine as claimed in claim 1,
    wherein the actuating hydraulic pressure of the actuator is a maximum pressure of the hydraulic pressure obtained by actually actuating the actuator.

3. The control method of an injection molding machine as claimed in claim 1,
    wherein the actuating hydraulic pressure of the actuator is a maximum pressure of the hydraulic pressure obtained by actually actuating the actuator.

4. The control method of an injection molding machine as claimed in claim 3,
    wherein in the step c), whether or not a difference between the on-setting pressure and the maximum pressure of the actuating hydraulic pressure is sufficiently bigger than a difference between the on-setting pressure and the off-setting pressure, is determined.

5. An injection molding machine, comprising:
    an actuator supplied with oil so as to actuate;
    an actuator pressure detection part configured to detect an actuating hydraulic pressure for actuating the actuator;
    an accumulator in which the oil, supplied to the actuator and having an accumulating hydraulic pressure detected by an accumulator pressure detection part set in a range of designated values, is accumulated;
    an accumulating hydraulic pressure determining part configured to determine whether or not the accumulating hydraulic pressure is sufficiently higher than the actuating hydraulic pressure detected by the actuator pressure detection part;
    an accumulating hydraulic pressure change part configured to reduce the range of the accumulating hydraulic pressure in a case where the accumulating hydraulic pressure is sufficiently higher than the actuating hydraulic pressure; and
    an accumulator control part configured to control the accumulating hydraulic pressure in the set range of the designated values, wherein the range of the designated values of the accumulating hydraulic pressure is defined by an on-setting pressure for making the accumulator control part ON and an off-setting pressure for making the accumulator control part OFF.

6. The injection molding machine as claimed in claim 1, wherein the actuating hydraulic pressure of the actuator is a maximum pressure of the hydraulic pressure obtained by actually actuating the actuator.

7. The injection molding machine as claimed in claim 1, wherein the actuating hydraulic pressure of the actuator is a maximum pressure of the hydraulic pressure obtained by actually actuating the actuator.

8. The injection molding machine as claimed in claim 7, wherein the accumulating hydraulic pressure determining part determines whether or not a difference between the on-setting pressure and the maximum pressure of the actuating hydraulic pressure is sufficiently bigger than a difference between the on-setting pressure and the off-setting pressure.

9. The injection molding machine as claimed in claim 1, further comprising an adjusting part configured to adjust an amount and a pressure of the oil supplied to the accumulator,
  wherein the accumulator is connected to the actuator by the adjusting part.

10. An injection molding machine, comprising:
  actuating means for being supplied with oil so as to actuate;
  actuator pressure detection means for detecting an actuating hydraulic pressure for actuating the actuator;
  accumulating means for accumulating the oil, the oil supplied to the actuating means and having an accumulating hydraulic pressure detected by accumulator pressure detection means set in a range of designated values;
  accumulating hydraulic pressure determining means for determining whether or not the accumulating hydraulic pressure is sufficiently higher than the actuating hydraulic pressure detected by the actuator pressure detection means;
  accumulating hydraulic pressure change process means for reducing the range of the accumulating hydraulic pressure in a case where the accumulating hydraulic pressure is sufficiently higher than the actuating hydraulic pressure; and
  accumulator control means for controlling the accumulating hydraulic pressure in the set range of the designated values, wherein the range of the designated values of the accumulating hydraulic pressure is defined by an on-setting pressure for making the accumulator control means ON and an off-setting pressure for making the accumulator control means OFF.

* * * * *

UNITED STATES PATENT AND TRADEMARK OFFICE
CERTIFICATE OF CORRECTION

PATENT NO. : 7,067,078 B2
APPLICATION NO. : 10/292446
DATED : June 27, 2006
INVENTOR(S) : Mitsuaki Amano Page 1 of 1

It is certified that error appears in the above-identified patent and that said Letters Patent is hereby corrected as shown below:

On the Title Page of the Patent, in Section (73), the name of the Assignee should read as follows:

Sumitomo Heavy Industries, Ltd., Tokyo (JP)

Signed and Sealed this

Thirteenth Day of November, 2007

JON W. DUDAS
*Director of the United States Patent and Trademark Office*